Jan. 31, 1967  D. W. MUELLER  3,301,041
PRESTRESSED CONCRETE CONTAINMENT VESSEL
Filed Aug. 28, 1964  2 Sheets-Sheet 1

INVENTOR.
Donald W. Mueller
BY
Roland C. Anderson

United States Patent Office 3,301,041
Patented Jan. 31, 1967

3,301,041
PRESTRESSED CONCRETE CONTAINMENT VESSEL
Donald W. Mueller, Los Alamos, N. Mex., assignor to the United States of America as represented by the United States Atomic Energy Commission
Filed Aug. 28, 1964, Ser. No. 392,978
4 Claims. (Cl. 73—35)

This invention relates to a containment vessel to contain internal pressure impulses such as explosions and more particularly to a prestressed spherical concrete vessel useful to contain explosions and to serve as a nuclear reactor containment vessel.

Explosion containment vessels of the prior art are exceedingly massive steel containers in which the steel is present in sufficient quantities to withstand the excursion due to the explosion shock wave. In accordance with the present invention, the shock wave is absorbed by a massive prestressed concrete container. This type of structure has the advantage over solid steel of ease of construction and attainment of biological shielding useful when radioactive emanations need to be contained.

Much work in weapons testing involves blast and high velocity fragments from the detonation of high explosives. The necessity for large area detonation ranges which are ordinarily required can be eliminated if a vessel of the type described by this invention is used to contain the blast and fragments associated with such work. In addition to blast and fragments, radioactive materials are sometimes involved in weapons experiments and spreading of radioactive contamination must be avoided.

With nuclear reactors there is need for protection from an accidental explosion of the reactor with regard to both blast and spreading of dangerous radioactive materials.

It is, accordingly, an object of the present invention to provide a relatively inexpensive and simple containment vessel suitable for containing explosive impulses.

A further object is to provide a combined containment vessel and biological shield for a nuclear reactor which is capable of containing radioactive products liberated in a reactor accident.

Other objects and advantages of the present invention will become apparent to those skilled in the art as the description and illustration thereof proceed.

Briefly, in accordance with the present invention, there is provided an inner spherical metal shell, an outer, larger in diameter, metal shell made up of segments bolted together and an intermediate massive spherical layer of concrete. The edges of the segments of the outer steel shell are drawn together to exert tensile stresses in the shell and compressive stresses in the concrete.

In order to permit experiments to be conducted inside the vessel of this invention, at least one large door and at least one auxiliary small door or port must be provided. Such doors must be capable of being hermetically secured, particularly if radioactive materials are utilized in connection with internal explosives, or if the vessel is utilized as a nuclear reactor containment vessel. In accordance with this invention, such doors are provided in a manner which does not conflict with the prestressing of the outside metal shell.

The above objects and advantages and other objects and advantages of this invention will become apparent as the specification of the same proceeds with reference to the drawings in which.

Figure 1:
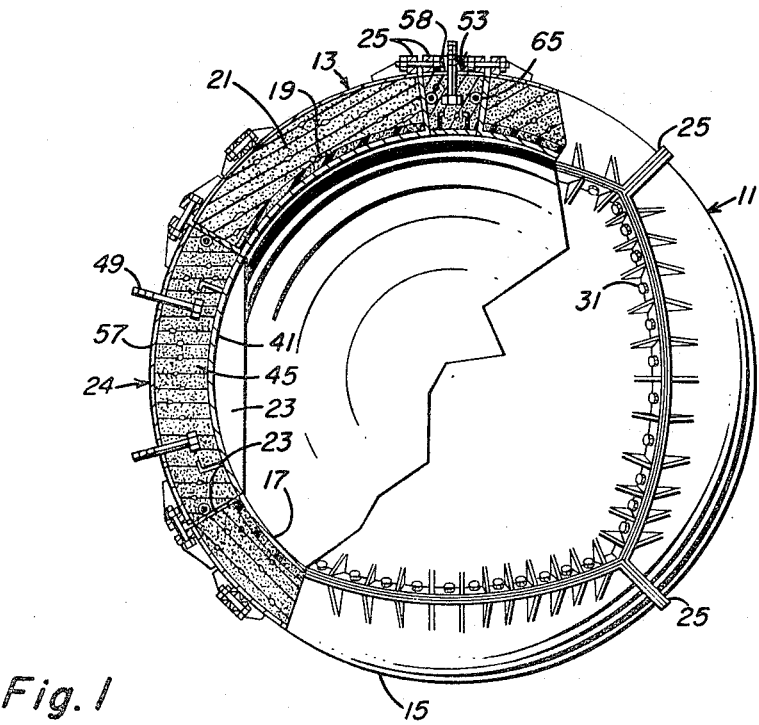
FIGURE 1 is a vertical plan view partly in section of a completed vessel in accordance with the present invention.

Referring to FIGURE 1, the containment vessel generally is indicated by reference numeral 11. It comprises an outer spherical metal shell 13 made up of bolted together segments 15, an inner spherical shell 17, a compressible skin or pad 19, preferably of silicon rubber stress cushion, and a thick concrete intermediate wall 21 which is prestressed in compression by tension in the outer metal shell 13. To the end that experiments and other useful activities can be engaged in inside the vessel, a large port 23 and one or more access ports 53 are provided.

The vessel is assembled in situ. The specific embodiment herein described is a vessel having a twenty foot outside diameter. The various parameters can be extrapolated to any desired size. The dimensions herein given pertain to a vessel capable of withstanding without damage a detonation equivalent to 80 pounds of composition B.

Figure 2:
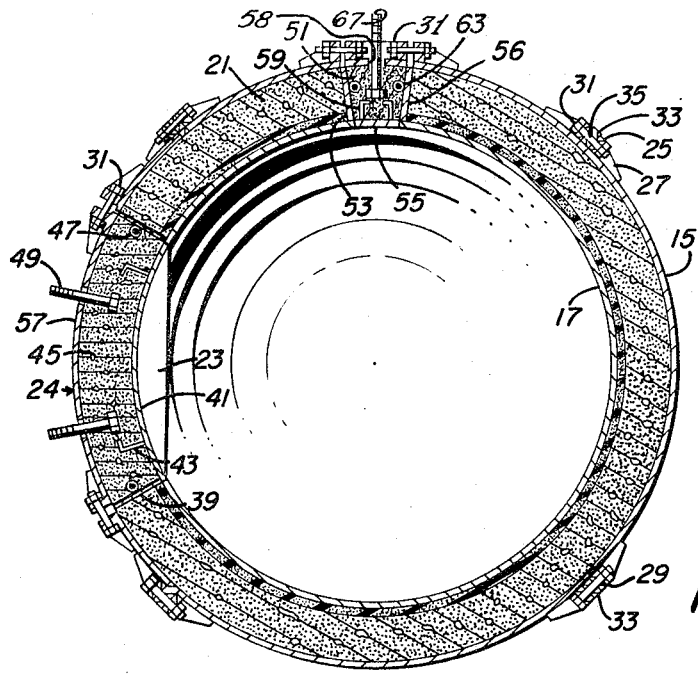
FIGURE 2 is a vertical cross section of the embodiment of FIGURE 1 with parts exaggerated for purposes of clarity.
Figure 3:
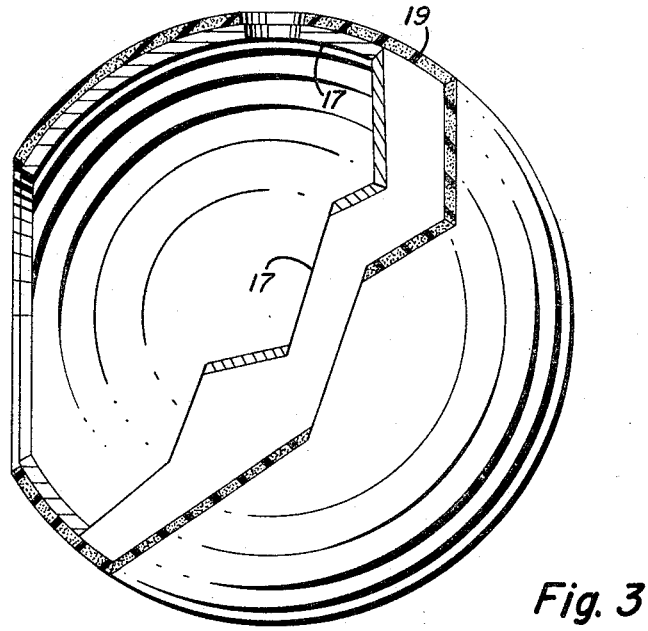
FIGURE 3 is a vertical view partly in diametrical section showing the inner shell of the vessel.

Referring to FIGURES 1, 2 and 3, provision for the principal holding forces is shown to be the segmented outer steel skin or shell 13, which in the 20 foot diameter embodiment is ½ inch thick. Tension is applied to the outside steel shell by a system of bolted flanges 25 to prestress the concrete in compression. An outward excursion within the limits of design unloads the compressive stress in the concrete without taking it into tension. The concrete acts as an inertial element, decreasing the energy that is absorbed by the vessel shells and counteracting the effects of structural discontinuities, such as flanges and doors, and any localized effects of shrapnel. The inner shell 17 in the 20 foot embodiment is 16 feet in diameter and is of steel of one inch thickness and protects the concrete from fragmentation due to shrapnel as well as provides the inside form for placement of the concrete. The combination of the heavy wall of concrete and the one and one-half inches of steel provides excellent shielding for radioactive materials.

The spherical shape of the vessel, the massive thick wall of concrete and the relatively thin outside steel shell used in pre-established tension are important features of this invention.

The primary advantage of a massive element in a vessel to contain explosives is shown mathematically as follows:

Consider the impulse $F dt$, per unit area, delivered by a shock wave to the containment vessel wall which has mass M per unit area. Then $F dt = M dv$ where $dv$ is the acceleration.

This analysis assumes one short duration shock and that the mass of the whole wall thickness receives the impulse. It is thus assumed that so little motion occurs at the surface during the shock impulse that $F dt$ and $M dv$ are practically independent of M, i.e., $F dt$ is a constant $k$. Then the velocity of the wall is $dv$ or, simply $v$, and $$v = k/M$$

The energy E, per unit area, i.e., $\tfrac{1}{2} M v^2$, in the wall is $$E = \tfrac{1}{2} M v^2 = \tfrac{1}{2} M (k/M)^2 = 1/M \tfrac{1}{2} k^2$$

i.e., the energy absorbed per unit area of the vessel wall, under the conditions assumed to be valid, is inversely proportional to M, the mass of the wall per unit area.

This energy may appear transiently as stretching in the outside holding element, the steel skin. The corresponding maximum stress in the holding element is related to the maximum energy in it by $$E = a \text{ (stress}_{max})^2 = 1/M(\tfrac{1}{2}k^2)$$

or $$\text{stress}_{max} \propto (1/M)^{\tfrac{1}{2}}$$

The maximum derived advantages in the present invention are obtained when the duration of the shock transient is short. If the duration is not short, the primary advantage of the large mass of concrete is diminished but the other advantages still remain.

The outer steel sphere may be made up of segments of any suitable number, but it has been found to be advantageous to use six spherical squares in order that the assembly may rest on the bottom segment with the bottom segment flanges accessible for clamp bolts. Another advantage of this arrangement is that the axis of the large door port is horizontal.

Referring now to FIGURE 2, certain features of the assembly are greatly exaggerated to facilitate describing the details thereof. The flanges 25 are welded to the edge portion of segments 15. To prevent concentrated bending stresses in the shell, gussets 27 are welded to the flanges and to the outer surface of the segment. The flanges are provided with bolt holes 29 similarly located on all segment flanges so that the bolt holes in adjacent flanges are in alignment in order to accommodate bolts 31.

The flange detail as shown in FIGURES 1 and 2 relates to the condition of the structure in preparation for pouring the concrete. In order to permit later prestressing, spacer bars 33 are provided between the shell segment flanges. The spacer bars in the 20 foot embodiment have a thickness of one inch and a depth of two and five-eighths inches and extend from the outside surface of the flanges to not less than a flush condition with the inside surface of the shell segment skin. Each spacer bar is provided with bolt holes 35 which align with the flange bolt holes. The requirement that the inside surface be at least flush with the adjacent inner surfaces of the shell segments is important in order to prevent ridges from being formed in the concrete which would interfere with later movement of the shell over the surface of the concrete during the tensioning and prestressing operation. After the concrete is poured and has set sufficiently, the spacer bars 33 are removed, and the bolts 31 are drawn up to a calculated tension to provide the desired compressional stress in the concrete layer.

The inner shell 17 is a simple sphere made up by forming to the selected radius, segments which are welded together at the edges. The shape of the segments may be any convenient selection. After the adjacent edges of the segments of the inner shell are welded together they are ground smooth on the outside to result in a smooth surface. The openings for the big port 23, access port 53 and any other ports are provided either by cutting the openings in the proper segments before they are joined together or flame-cutting the shell to provide ports after the sphere is fabricated, but before the concrete is emplaced.

Referring to FIGURE 3, the inner shell 17 is shown partly in section and covered with the silicon rubber stress cushion 19. The exact nature of the cushion 19 is not critical provided it is elastically compressible in order to permit the concrete upon setting and curing to shrink without cracking.

Figure 4:
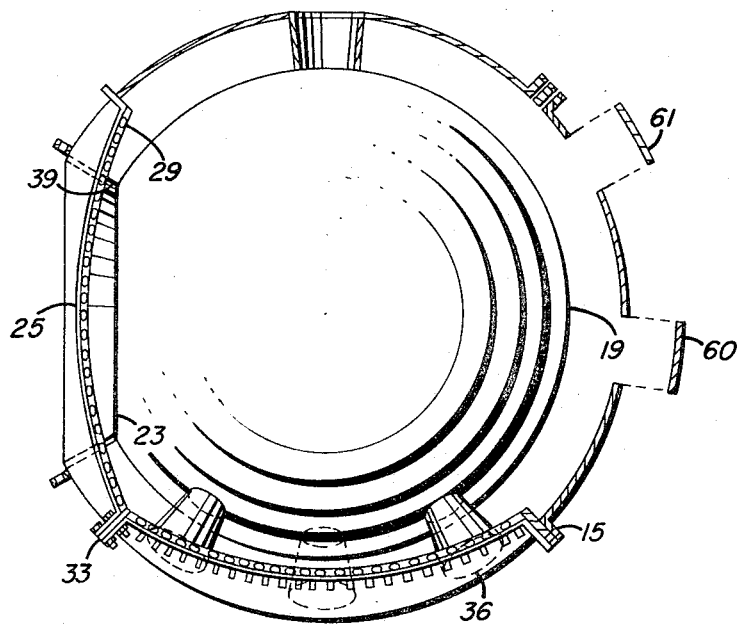
FIGURE 4 is a vertical view partly in section of a partly assembled vessel.

FIGURE 4 shows an intermediate step in constructing the device of the present invention. Inner sphere 17 with its compressible blanket 19 is supported on three or more concrete pedestals 36 with its center coincidental with the center of the outer shell. The assembly procedure continues from this point by the joining together of additional segments with the spacers 33 between the segment flanges as shown in FIGURES 1 and 2. The port 23 for the large door 24 is provided for by the installation of edge liner 39 prior to filling the space between the inner and outer spheres with concrete.

The edge liner 39 for the large door of the 20 foot embodiment is shown in vertical section in FIGURES 3 and 4. This edge liner 39 is a frusto cone of ¾″ thick aluminum and has a width equal to the space between the inner and outer sphere. A convenient method for casting the big door concrete section is to utilize liner 39 in a horizontal position on a suitable support. After the big door is cast, liner 39 is available to be used to line the big port. The inside spherical segment 41 of the big door is provided with welded-on concrete attaching rods 43. During the casting procedure of the door 24 an O-ring seat 47 is cast in the concrete plug 45 as shown in FIGURE 2. Metal lifting devices such as bolts 49 are cast in the concrete. The complete door in the 20 foot diameter embodiment has a weight of about 15 tons and is moved into position in the containment vessel, or removed therefrom by a transport vehicle. The spherical outside cover of the door is cut to a slightly smaller dimension than the port outer dimension so as to allow for stretching when the outer segment is stressed in tension by drawing up bolts 31 to seal the door and to compress the concrete inner wall.

The outer steel shell 13 is built up around, and concentric with, the inner shell 17 in a manner shown in FIGURE 4. The big door liner 39 is positioned in place between the shells.

At least one additional port is desirable. The small door or port plug 51 is shown in small port 53 in the top of the vessel as shown in FIGURES 1 and 2. This port is needed to permit a manipulator to be used to insert or position apparatus inside the structure after the large door 24 is in place. Other ports and port plugs may be provided as deemed necessary and the design of all such ports will be similar.

The requirements for port and plug design are quite critical and involve considerations of strength of the vessel, resistance to leakage of gases, and convenient provisions for removal and insertion of the plugs. The ports must be so designed as to avoid weakening the vessel. Density discontinuities as between the port and the vessel must be avoided. Stress concentrations in the outer shell in the vicinity of the port must be minimized.

The requirement of minimizing density discontinuity is met by making the port plug of the same materials as the rest of the vessel.

Referring again to FIGURE 2, the inside steel plate 41 of the door and 55 of the port plug are of the same thickness as the inside shell 17. The outer steel plate 57 of the door and 58 of the port plug are of the same thickness as the outside shell 13. The plugs of concrete in the port closures are of the same density and thickness as the concrete layer 21. The large port is bounded on the side by a metal cone 39 and the small port 53 by a metal cone 56.

Although it would be simpler to stress the skin of the vessel around the ports by tensioning devices between the plug or door outer plates and the outer shell surrounding area, it is desired, in order to avoid severe stress concentrations in the outer shell when a plug or door is removed, to provide an adequate port flange around the opening to stress the outer shell skin to a degree similar to the general stress in the remainder of the shell. Accordingly, the port flange is to be properly proportioned to attain the same shell stress in the vicinity of the port as it is elsewhere.

The stress $(s)$ in the shell surrounding the port has the required value when it is equal to $Ef/(1-u)$ where E is Young's modulus, $f$ is the strain, and $u$ is Poisson's ratio $=0.3$.

The hoop stress, $t$, in the flange would be $$t = srd/A = Ee$$

where $d$ = shell thickness, $r$ = radius of port at flange
$A$ = cross-sectional area of flange
$e$ = hoop strain in flange
$d$ = outer shell thickness
$r$ = radius of port Under the stated conditions, the strain in the flange and the strain in the surrounding shell will be equal. Therefore, the cross-sectional area A of the flange is $$srd/Ee = srd/Ef = dr/(1-u)$$

Assuming a shell thickness $d$ of ½″ and a port radius at the outer shell plane to be 14 inches, A calculates to be 10 square inches.

The holding devices binding the port and plug flanges together are designed to transmit as much inward force to the plug as could be transmitted by the outer shell as if it were continuous.

Thus, if the tensile stress in the outer shell due to tensioning of the prestressing flange bolts is 50,000 pounds per square inch, the radial force F on a port plug of 14″ radius is $$Sd\ 2\pi\ r\ \sin\theta = 206{,}000\ \text{pounds}$$

where $\theta$ is the port half angle and equals $\sin^{-1} 9/96$.

The shear strength for steel is usually taken to be three-quarters of the tensile strength. Assuming a steel of 100,000 p.s.i. tensile strength in the port flange and holding devices, four pins or bolts of 1″ diameter are adequate to maintain a 14″ radius port plug in position.

Referring to FIGURE 2, additional details of a port and port plug are shown. The inside steel plate 55 is secured to the concrete plug by anchor rods 59. The outer plate 58 is not affixed to the concrete plug but is free to shift to facilitate the insertion of the pins or bolts 61. The concrete plug 51 has cast into its conical surface an O-ring groove 63. When plug 51 is in place it is hermetically sealed to the port cone 56 by O-ring 65. A bolt 67 is anchored in plug 51 to permit the plug to be inserted and removed.

The port plug 51 and door 24 are secured in place during construction to hold the symmetry of the edge liners and to hold inside sphere 17 in position relative to the outside sphere during placement of the concrete between the spheres.

The placement of the concrete between the shells is performed after all the steel work is in its final position. For inserting the concrete, circular manholes 60, 61 of convenient size, such as 18 inches in diameter, are cut through the outer shell at several levels. These manholes can be any desired number, such as three on each level, although only one is shown in the drawing. The cutouts are resecured in place by welds or bolted flanges just before the level of the concrete reaches the bottom of the opening. In the 20 foot diameter embodiment, the space between the outer and inner shell is two feet in width and admits of workmen in the space for working the concrete. At proper intervals the concrete is vibrated to eliminate voids. All the concrete is placed in a continuous operation.

Having thus described this invention, what is claimed is:

1. A concrete containment vessel comprising a spherical inner shell, a compressible blanket affixed to and substantially completely covering the exterior surface of said inner shell, an outer spherical steel shell of larger radius than that of the inner shell supported concentrically with the inner shell, a concrete layer completely filling the space between the inner and outer shell, said outer shell comprising spherical segments having edge flanges and bolts under tension joining adjacent flanges whereby said outer shell is stressed in tension and said concrete layer is stressed in compression.

2. A concrete containment vessel for repetitively confining test explosions comprising spaced concentric spherical inner and outer rigid shells, a compressible blanket overlaying the exterior surface of the inner shell, a deposited in situ concrete filler filling the space between the two shells, and means for tensioning the outer shell to compress the concrete filler.

3. The containment vessel of claim 2 in which the tensioning means tension the outer shell an amount calculated to prestress the concrete in compression at least equal to the expansive force of the maximum confined explosion whereby the outward excursion of the concrete is limited to not exceed zero compressive stress.

4. A concrete containment vessel for confining internal impulse type overpressures comprising an outer spherical metal shell, an inner spherical metal shell having a diameter less than the diameter of the outer shell, means supporting said inner shell in concentric relation in said outer shell, at least one port communicating from the exterior of the outer shell to the interior of the inner shell, said port being bounded by a metal frusto cone extending from the port in the outer shell to the port of the inner shell, a compressible blanket affixed to and covering the exterior surface of the inner shell, concrete hardened in situ filling the space between said shells, said outer shell comprising spherical segments having edge flanges with adjacent edge flanges of adjacent segments in the unstressed state being spaced apart a distance approximately equal to the thickness of the outer shell, means drawing said adjacent flanges toward one another to stress the concrete in compression an amount equal substantially to the maximum outer force generated by a selected overpressure whereby to avoid tensile forces in said concrete.

References Cited by the Examiner

UNITED STATES PATENTS

| 2,474,660 | 6/1949 | Fitzpatrick | 52—224 X |
| 2,632,226 | 3/1953 | Anderson | 52—20 X |
| 3,237,358 | 3/1966 | Harris | 52—224 |

FOREIGN PATENTS

| 625,378 | 8/1961 | Canada. |
| 823,425 | 10/1937 | France. |
| 1,041,337 | 5/1953 | France. |

RICHARD C. QUEISSER, *Primary Examiner.*

J. J. GILL, *Assistant Examiner.*